US011149660B1

(12) United States Patent
Gerty et al.

(10) Patent No.: US 11,149,660 B1
(45) Date of Patent: Oct. 19, 2021

(54) CYLINDER DEACTIVATION TO MAXIMIZE KINETIC TO POTENTIAL ENERGY CONVERSION IN BRAKING EVENTS

(71) Applicant: PACCAR Inc, Bellevue, WA (US)

(72) Inventors: Michael D. Gerty, Bellingham, WA (US); Matthew White, Port Orchard, WA (US)

(73) Assignee: PACCAR Inc., Bellevue, WA (US)

( * ) Notice: Subject to any disclaimer, the term of this patent is extended or adjusted under 35 U.S.C. 154(b) by 0 days.

(21) Appl. No.: 16/885,932

(22) Filed: May 28, 2020

(51) Int. Cl.
| F02D 13/06 | (2006.01) |
| F02D 41/00 | (2006.01) |
| F02D 13/02 | (2006.01) |
| F02D 41/04 | (2006.01) |
| F01L 13/00 | (2006.01) |
| B60W 20/15 | (2016.01) |
| B60W 10/06 | (2006.01) |
| B60W 10/08 | (2006.01) |

(Continued)

(52) U.S. Cl.
CPC ............ F02D 13/06 (2013.01); B60W 10/06 (2013.01); B60W 10/08 (2013.01); B60W 20/15 (2016.01); B60W 30/18127 (2013.01); F01L 13/0005 (2013.01); F02D 13/0215 (2013.01); F02D 41/0087 (2013.01); F02D 41/04 (2013.01); B60W 20/14 (2016.01); B60W 2510/244 (2013.01); B60W 2552/15 (2020.02); F02D 2200/101 (2013.01); F02D 2200/1002 (2013.01); F02D 2200/501 (2013.01); F02D 2200/702 (2013.01); F02D 2400/02 (2013.01)

(58) Field of Classification Search
CPC .. F02D 13/06; F02D 13/0215; F02D 41/0087; F02D 41/04; F02D 2200/1002; F02D 2200/101; F02D 2200/501; F02D 2200/702; F02D 2400/02; B60W 20/15; B60W 20/14; F01L 13/0005
See application file for complete search history.

(56) References Cited

U.S. PATENT DOCUMENTS

2002/0116112 A1* 8/2002 Wakashiro ............... B60K 6/54
 701/110
2003/0106728 A1* 6/2003 Kitajima ................. F02D 13/06
 180/65.26

(Continued)

FOREIGN PATENT DOCUMENTS

JP 2001140665 A * 5/2001

*Primary Examiner* — George C Jin
(74) *Attorney, Agent, or Firm* — Merchant & Gould P.C.

(57) ABSTRACT

Systems and methods for providing charge to an energy storage system of a vehicle are provided. The method may include receiving, by a vehicle control system, an indication that a vehicle is coasting, slowing, and/or braking. Based on the received indication, engaging, by the vehicle control system, an electric motor coupled to an internal combustion engine to generate electric charge and provide the generated electric charge to the energy storage system, and while engaging the electric motor to generate electric charge, deactivating, by the vehicle control system, a cylinder of the internal combustion engine by maintaining an inlet valve of the cylinder and an exhaust valve the cylinder in a constant position, such as a closed position. In some instances, the inlet valve and exhaust valve may be maintained in an open state to further slow the vehicle.

19 Claims, 7 Drawing Sheets

(51) Int. Cl.
   *B60W 30/18*   (2012.01)
   *B60W 20/14*   (2016.01)

(56) References Cited

U.S. PATENT DOCUMENTS

| | | | |
|---|---|---|---|
| 2009/0282807 A1* | 11/2009 | Rioli | F02D 41/1439 60/276 |
| 2013/0276730 A1* | 10/2013 | Borean | F01L 1/34 123/90.11 |
| 2016/0152226 A1* | 6/2016 | Lee | B60W 20/16 701/22 |
| 2018/0141538 A1* | 5/2018 | Doering | B60K 6/50 |
| 2018/0186361 A1* | 7/2018 | Zhang | B60L 3/0046 |

\* cited by examiner

CYLINDER DEACTIVATION TO MAXIMIZE KINETIC TO POTENTIAL ENERGY CONVERSION IN BRAKING EVENTS

BACKGROUND

Commercial transport vehicles, such as tractors with trailers may employ one or more micro-hybrid or mild-hybrid technologies. Micro-hybrid technology generally saves fuel by cutting power to a vehicle's engine when the engine is idling, such as when the vehicle is stopped. Mild-hybrid vehicles generally include an internal combustion engine that is equipped with an electric machine, such as an e-motor, that allows energy to be captured when a vehicle is coasting, braking, or slowing. Mild-hybrid vehicles may also employ regenerative braking and some level of power assist to the internal combustion engine. While the use of mild-hybrid and micro-hybrid technologies increases an efficiency of a vehicle, additional technologies may be utilized to further increase the efficiency of the mild-hybrid and micro-hybrid technologies.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for deactivating a cylinder of an internal combustion engine to reduce drag and/or resistance the internal combustion engine when utilizing an e-motor for energy generation and storage. For example, an inlet valve and an exhaust valve of the cylinder may be maintained in a constant position, such as a closed position such that air neither enters nor exits the cylinder. Accordingly, the cylinder does not pump air through the cylinder with every cylinder stroke.

In accordance with at least one example of the present disclosure, a vehicle is provided. The vehicle may include at least one axle, an internal combustion engine including a cylinder having an inlet valve and an exhaust valve, an electric motor coupled to the engine, and a vehicle control system configured to engage the electric motor to generate electric charge and deactivate the cylinder by maintaining the inlet valve and the exhaust valve in a constant position.

In accordance with at least one example of the present disclosure, a method of providing charge to an energy storage system of a vehicle is provided. The method may include receiving, by a vehicle control system, vehicle information, based on the received vehicle information, engaging, by the vehicle control system, an electric motor coupled to an internal combustion engine to generate electric charge and provide the generated electric charge to the energy storage system, and while engaging the electric motor to generate electric charge, deactivating, by the vehicle control system, a cylinder of the internal combustion engine by maintaining an inlet valve of the cylinder and an exhaust valve the cylinder in a constant position.

In accordance with at least one example of the present disclosure, a vehicle control system including one or more non-transitory computer-readable media storing instructions is provided. The instructions, when executed by a processor associated with the vehicle control system, cause the vehicle control system to engage an electric motor coupled to an internal combustion engine of the vehicle to generate electric charge, provide the generated electric charge to an energy storage system, and while engaging the electric motor to generate electric charge, maintain an inlet valve of a cylinder of the internal combustion engine in a constant position and maintain an exhaust valve of the cylinder of the internal combustion engine in a constant position.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, a software implementation, or an implementation combining software and hardware aspects. The following detailed description is, therefore, not to be taken in a limiting sense.

Figure 1:
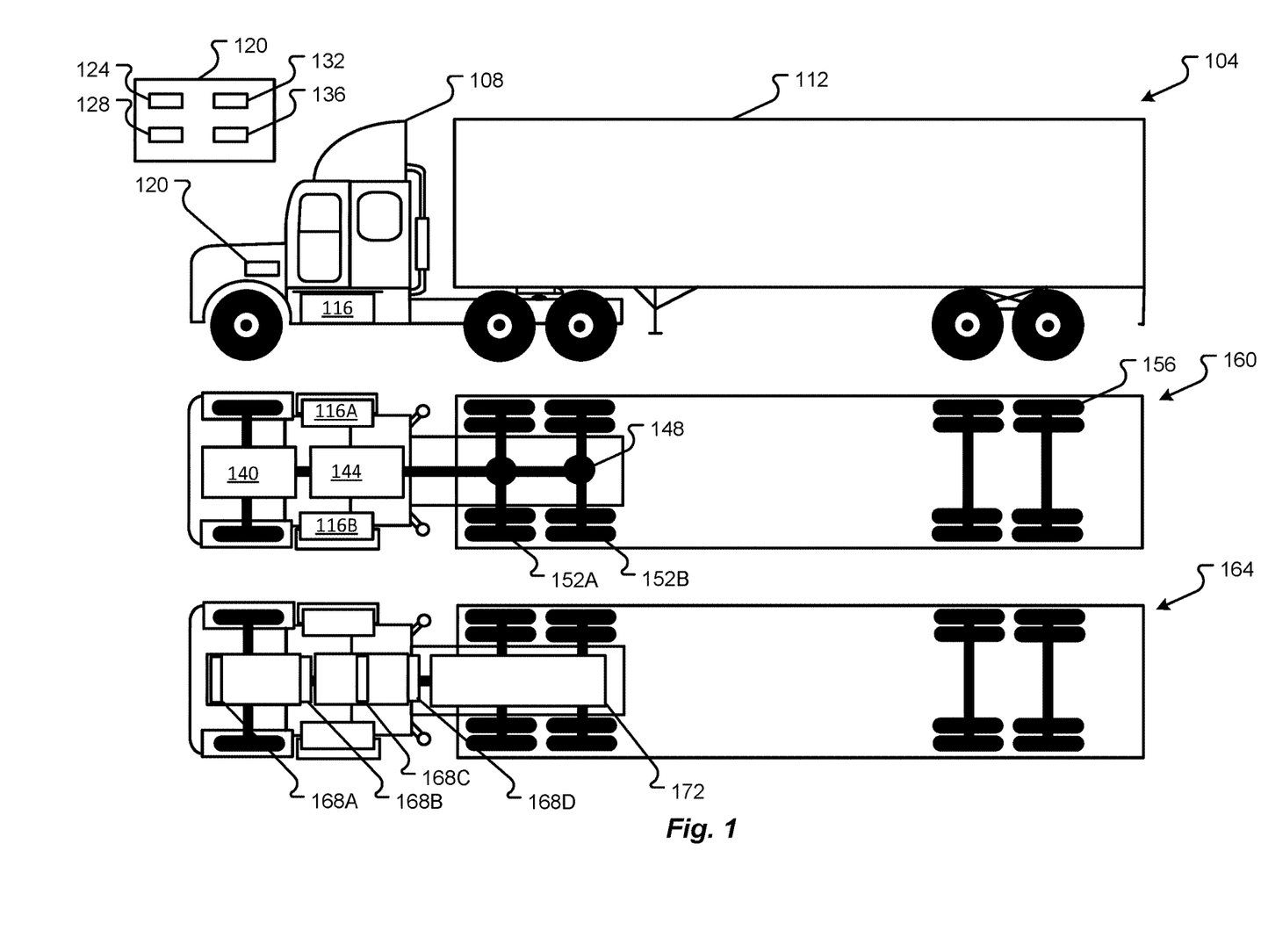
FIG. 1 depicts a semi-tractor and trailer in accordance with examples of the present disclosure.

FIG. 1 depicts a vehicle 104, such as a semi-tractor and trailer, in accordance with examples of the present disclosure. The vehicle 104 may include a tractor 108 and trailer 112. An underside view of the vehicle 104 is provided as 160. The tractor 108 generally includes an internal combustion engine 140, a transmission or gearbox 144, and a drive train 148. Fuel from one or more fuel tanks 116A and/or 116B may be delivered to the internal combustion engine 140, where a vehicle control system 120 may control how much fuel is delivered, a gear of the vehicle 104, and a speed of the vehicle 104, thereby influencing an overall fuel efficiency of the vehicle 104. As the internal combustion engine 140 is coupled to the transmission 144 to provide torque to the drive wheels 152A and 152B via a driveline portion 148, the tractor 108 may pull the trailer 112. The wheels 156 of the trailer 112 are generally free-rolling wheels, as no power from the driveline portion 148 is transferred to such wheels.

The vehicle control system 120 may be a processor-based system, such as an embedded system, that includes one or more processors 124 that are communicatively coupled to control certain operations of the vehicle in which the vehicle control system 120 is installed. The one or more processors 124 are part of or communicatively coupled to an electronic control unit 128 of the vehicle to electronically control operational characteristics of the vehicle, such as engine power output, braking, and transmission gear, by way of non-limiting example. The one or more processors 124 are also communicatively coupled to receive measurements from sensors on the vehicle measuring operational characteristics of the vehicle, such as vehicle speed, crankshaft rotational speed, driveshaft rotational speed, transmission speed sensor, and brake pressure, also by way of non-limiting example.

The one or more processors 124 may include central processing units (CPU's), microcontrollers (MCU), digital signal processors (DSP), application specific integrated circuits (ASIC), and the like. The processors interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory. In some embodiments, some or all of the one or more processors 124 may be hardware specifically configured or hardwired to perform at least some of the operations described herein. For instance, the one or more processors 124 may include application specific integrated circuits (ASICs), field programmable gate arrays (FPGAs), system-on-a-chip (SoC), or other specialized or customizable computing hardware. In some embodiments, some or all of the one or more processors 124 may be part of a controller configured to interface with components on the vehicle 104 and perform the operations described herein.

The vehicle control system 120 also includes memory 132 communicatively coupled with the one or more processors 124 for storing data, such as speed trajectory information described herein. The memory 132 may include volatile computer-readable media (e.g., random-access memory) and/or non-volatile computer-readable media (e.g., read-only memory) for reading and writing data. The memory 132, in some examples, stores a set of instructions that, as a result of execution by the one or more processors 124, causes the vehicle control system 120 to perform operations described herein.

The vehicle control system 120 may include or is coupled to one or more communication interfaces 136 that enable the vehicle control system 120 to communicate wirelessly with systems external to the vehicle. The communication interfaces 136 include one or more transceivers configured to send and receive electromagnetic signals according to one or more wireless communication protocols for wireless communications with one or more devices external to the semi-truck and trailer 104. The communication interfaces 136, for example, may include cellular communication devices, Wi-Fi® communication devices, Bluetooth® communication devices, and Zigbee® communication devices that are configured to operate according to corresponding communication protocols. The communication interfaces 136, in some examples, include a satellite communication device that is configured to communicate with satellites in orbit around the Earth. The communication interfaces 136 may also communicate with ground-based antennas (not shown) of terrestrial communication systems. In some embodiments, the communication interface 136 may include a port or wireless interface for communicatively coupling with a mobile device (e.g., smart phone) of an occupant of the vehicle such that the vehicle control system 120 is enabled to obtain information via a cellular or other wireless network to which the mobile device is connected.

The vehicle control system 120 further includes or is coupled with one or more sensors 138 that are configured to measure distance to adjacent vehicles or objects around the vehicle. In particular, the one or more sensors 138 are positioned and configured to measure a distance to an adjacent vehicle ahead of the vehicle in which the vehicle control system 120 is installed. The one or more sensors 138 may also be positioned and configured to measure a distance to adjacent vehicle behind the vehicle in which the vehicle control system 120 is installed. Non-limiting examples of the one or more sensors 138 include radar sensors, light detection and ranging sensors (LIDAR), laser rangefinders, and sonar sensors. The one or more processors 124 receive measurements from the one or more sensors 138 and control operation of the vehicle based on the measurements.

The vehicle control system 120 may obtain information regarding an upcoming segment of the road for a route along which the vehicle is traveling. The vehicle control system 120 may receive, from a Global Positioning System Receiver (GPS) associated with the vehicle 104, location information indicating a position of the vehicle 104 and may obtain route information regarding a route along which the vehicle is traveling to reach a destination. The vehicle control system 120 further obtains terrain information indicating features of the route along which the vehicle is traveling, including features of the upcoming segment that may include a descent down a hill.

The terrain information obtained includes or is usable to determine information regarding grade (e.g., incline grade, decline grade) in the upcoming segment of the road. The vehicle control system 120 may determine, based on the terrain information obtained, that the upcoming segment includes a descent having a defined grade or a grade profile. The vehicle control system 120 may determine grade or slope for a plurality of positions along the upcoming segment relative to a certain position along the road. The certain position may be, for example, a current position of the vehicle 104 in which the vehicle control system 120 is installed or a current position of a vehicle in front of the vehicle 104. For example, the vehicle control system 120 may determine that the upcoming segment has a first slope at a first distance from the certain position of the vehicle in front of the vehicle 104, and determine that the upcoming segment has a second slope at a second distance from the certain position of the vehicle in front of the vehicle 104 on the road. The terrain information may include or be usable to determine other information regarding the upcoming segment, such as curvature of the road or changes in speed limit.

The vehicle control system 120 may obtain terrain information via communication with an orbiting satellite or a ground-based transceiver, such as a cellular base station or a radio tower. In some embodiments, the vehicle control system 120 may obtain terrain information from a mobile device in the vehicle via the one or more communication interfaces 136. The vehicle control system 120 may, in some implementations, obtain traffic information that indicates traffic conditions along the upcoming segment or other portions of the road or route along which the vehicle is to travel.

The vehicle control system 120 may determine a following distance to an adjacent vehicle ahead based on measurements received from the one or more sensors 138. The vehicle control system 120 may obtain a plurality of measurements over time to determine a speed of an adjacent vehicle relative to the speed of the vehicle on which the vehicle control system 120 is installed. In some examples, the information received from the one or more sensors 138 may include image information obtained by a camera or other imaging device. In such implementations, the vehicle control system 120 or an intermediate system may process the image information to determine a distance to an adjacent vehicle ahead.

The vehicle control system 120 may use the terrain information and may use the distance measurements to determine speed trajectory information to implement for the vehicle when traveling along an upcoming segment. The speed trajectory information may include a predicted maximum speed trajectory that the vehicle can travel along the upcoming segment. The predicted maximum speed trajectory may specify, for a plurality of positions or distances along the upcoming segment relative to a certain position along the road, the maximum speed being a speed that the vehicle can travel given the terrain information and characteristics of the vehicle. The speed trajectory information determined by the vehicle control system 120 also includes a predicted speed trajectory of the vehicle along the upcoming segment. The predicted speed trajectory specifies the predicted speed of the vehicle for a plurality of positions or distances along the upcoming segment relative to a certain position or location given the terrain information and an operational scheme for operation of the vehicle, as described elsewhere herein. The predicted speed trajectory may also include predicted following distances to an adjacent vehicle ahead at given positions or distances along the upcoming segment.

In accordance with examples of the present disclosure, the semi-tractor and trailer 104 may employ one or more micro-hybrid or mild-hybrid technologies. Micro-hybrid technology works by saving fuel by cutting power to the engine when the engine is idling or otherwise not providing power to the transmission 144 and/or drivetrain 148. Accordingly, not only is an amount of emission reduced, but the vehicle 104 may be more efficient as fuel is not consumed when the vehicle 104 is idling. Mild-hybrid vehicles (also known as power-assist hybrids, battery-assisted hybrid vehicles or BAHVs) are generally vehicles with an internal combustion engine equipped with an electric machine (e-motor) allowing the engine to be turned off whenever the vehicle is coasting, braking, or stopped, yet restarted quickly. Mild-hybrid vehicles may employ regenerative braking and some level of power assist to the internal combustion engine (ICE).

For example, an e-motor may be placed at or near the internal combustion engine 140 as depicted as an e-motor 168A. When engaged, the e-motor 168A may be powered by the internal combustion engine 140 utilizing belt-driven, gear-driven, and/or flywheel technology. Accordingly, when the vehicle 104 coasts or is braking for example, the internal combustion engine 140 may continue to operate or otherwise function without fuel, where the power necessary to cycle the pistons of the internal combustion engine 140 and therefore one or more belts or gears engaged with a piston crankshaft, may be provided by the drivetrain 148, rear axle, and/or transmission 144. As used herein, an "e-motor" or "electric motor" includes an electric motor device that operates at least as a generator and may include other functions as well, such as operating as an alternator.

As another non-limiting example, an e-motor 168B may be placed between the internal combustion engine 140 and the transmission 144. When the e-motor 168B is engaged, power may be provided to the e-motor 168B when the vehicle 104 coasts or is braking by the drivetrain 148 and/or transmission 144. In some examples, when the e-motor 168B is provided between the internal combustion engine 140 and the transmission 144, the internal combustion engine 140 may be temporarily disconnected from the transmission 144 such that power provided by the drivetrain 148 to the transmission is not utilized to cause one or more pistons to move within the internal combustion engine cylinders.

As another non-limiting example, an e-motor 168C may be integrated into the transmission 144. Similar to the e-motor 168B, power may be provided to the e-motor 168C when the vehicle 104 coasts or is braking by the drivetrain 148 and/or one or more portions of the transmission 144. As further depicted in FIG. 1, an e-motor 168D may be between the transmission 144 and drivetrain 148. Similar to the e-motor 168B, power may be provided to the e-motor 168D when the vehicle 104 coasts or is braking by the drivetrain 148.

The e-motor 168 may be utilized to provide a charge to one or more energy storage systems, such as energy storage system 172. Accordingly, when the vehicle 104 may require an e-motor assist, such as when accelerating, going up an inclined road segment, or otherwise, charge from the energy storage system 172 may be provided to the e-motor 168 to augment or otherwise assist the internal combustion engine 140.

Advantageously, an e-motor 168C integrated into the transmission 144 or 168D between the transmission and the drivetrain 148 would provide the ability to disengage the e-motor 168C or 168D from the engine 140; however, the integration with various transmissions and drivetrains may be cost prohibitive.

As such, in some instances, the e-motor 168A and/or 168B is operatively coupled to the internal combustion engine 140 and may be selectively engaged and disengaged with the internal combustion engine 140. While coupling the e-motor 168A and/or 168B to the internal combustion engine 140 may provide reduced integration costs, the e-motor 168A and/or 168B may not be entirely disengaged from the internal combustion engine 140 when the e-motor 168A and/or 168B is recapturing energy (e.g., during a coast or braking event). Accordingly, energy transfer losses may occur because energy is required to cycle the pistons of the internal combustion engine 140 in order to turn the e-motor 168A and/or 168B. Moreover, when the internal combustion engine 140 is motored, that is when the engine pistons are cycled or turned utilizing external or outside energy, the engine generally acts like an air pump, as air is pulled into engine cylinders during the intake stroke and pushed out of the cylinders during the exhaust stroke. As such, present systems and methods may attempt to maximize energy recapture by the e-motor while using the increased drag/resistance of the engine when appropriate to provide additional braking for the vehicle or otherwise meet the needs of vehicle operation.

Figure 2:
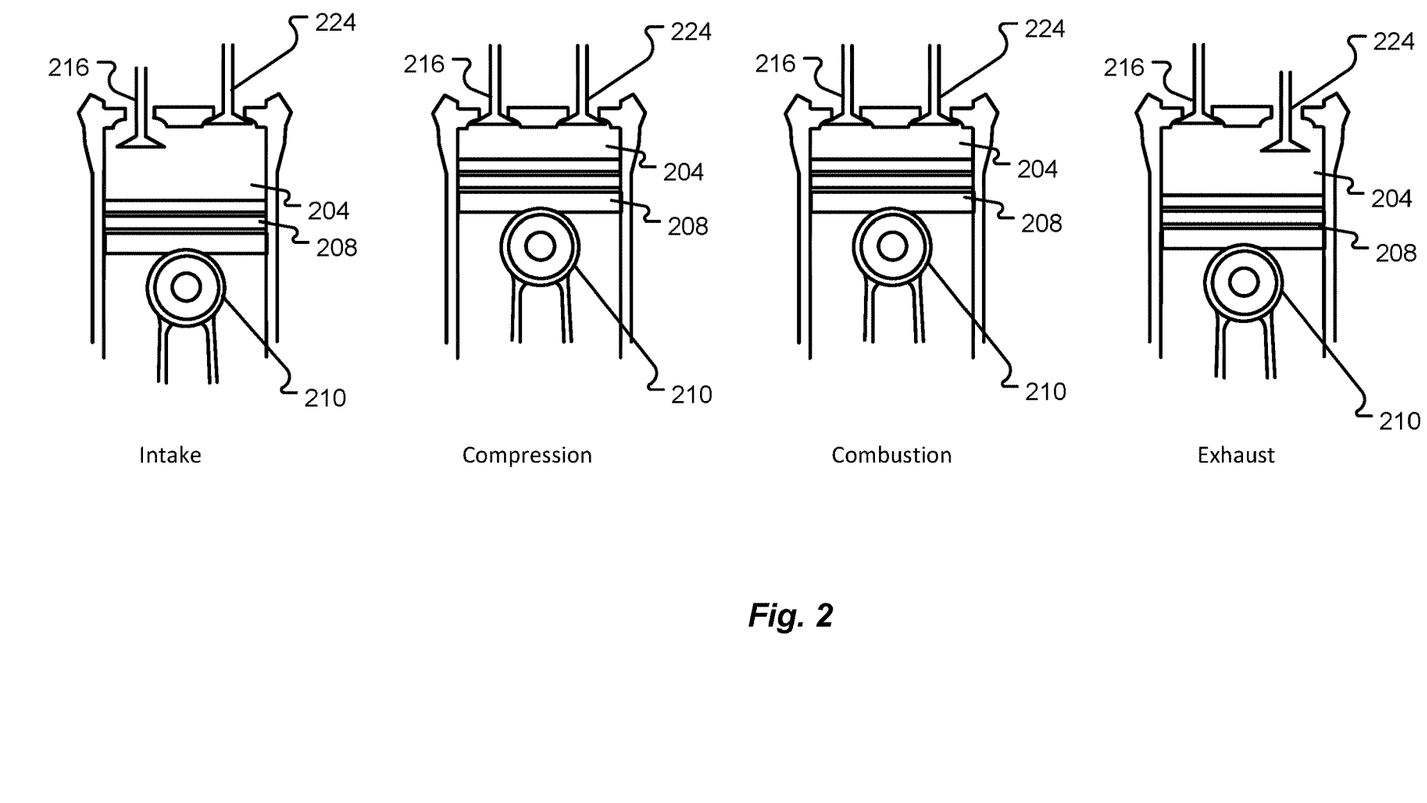
FIG. 2 depicts a first example of a cylinder, inlet valve, and exhaust valve operation in accordance with examples of the present disclosure.

A normal operation of a cylinder in an internal combustion engine is depicted in FIG. 2. For simplicity, only one cylinder is depicted, but it will be appreciated that most engines have more than one cylinder and the methods and systems described in this application may be applied to one, several, or all such cylinders, as needed. During the intake stroke, the inlet valve 216 may open allowing air to be sucked into the cylinder 204 as the piston 208 travels downward in accordance with a connecting rod 210 being engaged with a crankshaft. As the intake stroke sucks air (or, in examples, an air/fuel mixture) into the cylinder 204, the exhaust valve 224 may be in a closed position such that exhaust is not pulled into the cylinder 204. During the compression stroke, both the inlet valve 216 and the exhaust valve 224 are in the closed position such that when the piston moves in an upward direction in accordance with the connecting rod 210, air and fuel added to the cylinder 204 are compressed by the piston 208. During the combustion stroke, the fuel and air mixture is ignited forcing the piston 208 in a downward direction of the cylinder 204. During the combustion phase, the inlet valve 216 and exhaust valve 224 are generally in the closed position. Lastly, during the exhaust phase, the piston 208 pushes the exhaust from the cylinder 204 and out the exhaust valve 224. Thus, as the exhaust stroke actively pushes exhaust gases from the cylinder 204, the inlet valve 216 is in the closed position. For simplicity, only one intake valve and one exhaust valve are depicted, but it will be appreciated that some cylinders have more than one intake valve and exhaust valve and the methods and systems described in this application may be applied to one, several, or all such intake valves and exhaust valves, as needed.

Accordingly, when fuel is not added to the cylinder 204 during the compression stroke, or introduced into the air intake system (such as during a coast), there is no resulting combustion; however, when the internal combustion engine is coupled to an e-motor that has been engaged, the pistons move up and down and the inlet valve 216 and exhaust valve 224 open and close as they would normally. Thus, air is pulled into to the cylinder 204 during the intake stroke, compressed during the compressions stroke, decompressed during the combustion stroke, and then pushed out of the cylinder 204 during the exhaust stroke, effectively turning the engine into an air pump. While this air pumping action can be useful in some instances, such as when the engine is utilized to slow the vehicle, the air pumping action is a source of lost energy that reduces the efficiency of an e-motor when attempting to recapture kinetic energy of the vehicle. In accordance with examples of the present disclosure, to reduce the energy losses associated with motoring the engine, the inlet valve 216 and the exhaust valve 224 may be fixed in a constant position (such as a closed position) when engaging the e-motor to recapture energy in a coast or braking operation.

Figure 3:
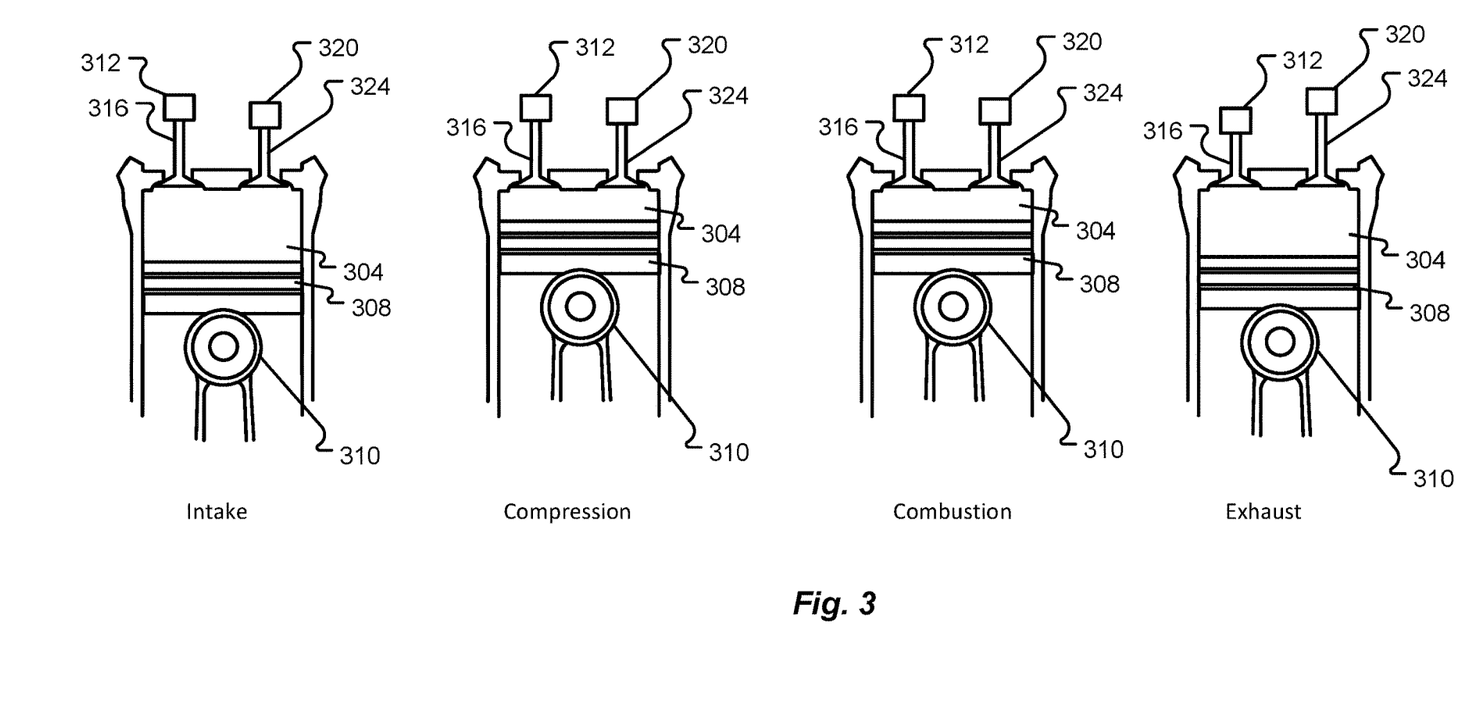
FIG. 3 depicts a second example of a cylinder, inlet valve, and exhaust valve operation in accordance with examples of the present disclosure.

That is, as depicted in FIG. 3, variable valve actuators 312 and 320 may control when the inlet valve 316 and exhaust valve 324 open and close. In accordance with examples of the present disclosure, when the engine is motored, the variable valve actuators 312 and 320 may cause the inlet valve and the exhaust valve to remain in a closed position during the intake, compression, combustion, and exhaust strokes—effectively deactivating a respective cylinder. Accordingly, while the piston 308 goes up and down in the cylinder 304 in accordance with the movement of the connecting rod 310, no air is pumped into or out of the cylinder 304. Therefore, the increased drag and resistance associated with the engine functioning as an air pump can be reduced or otherwise minimized. In addition, the piston 308 may go up and down in the cylinder 304 and a steady state air temperature within the cylinder 304 may be reached.

Figure 4:
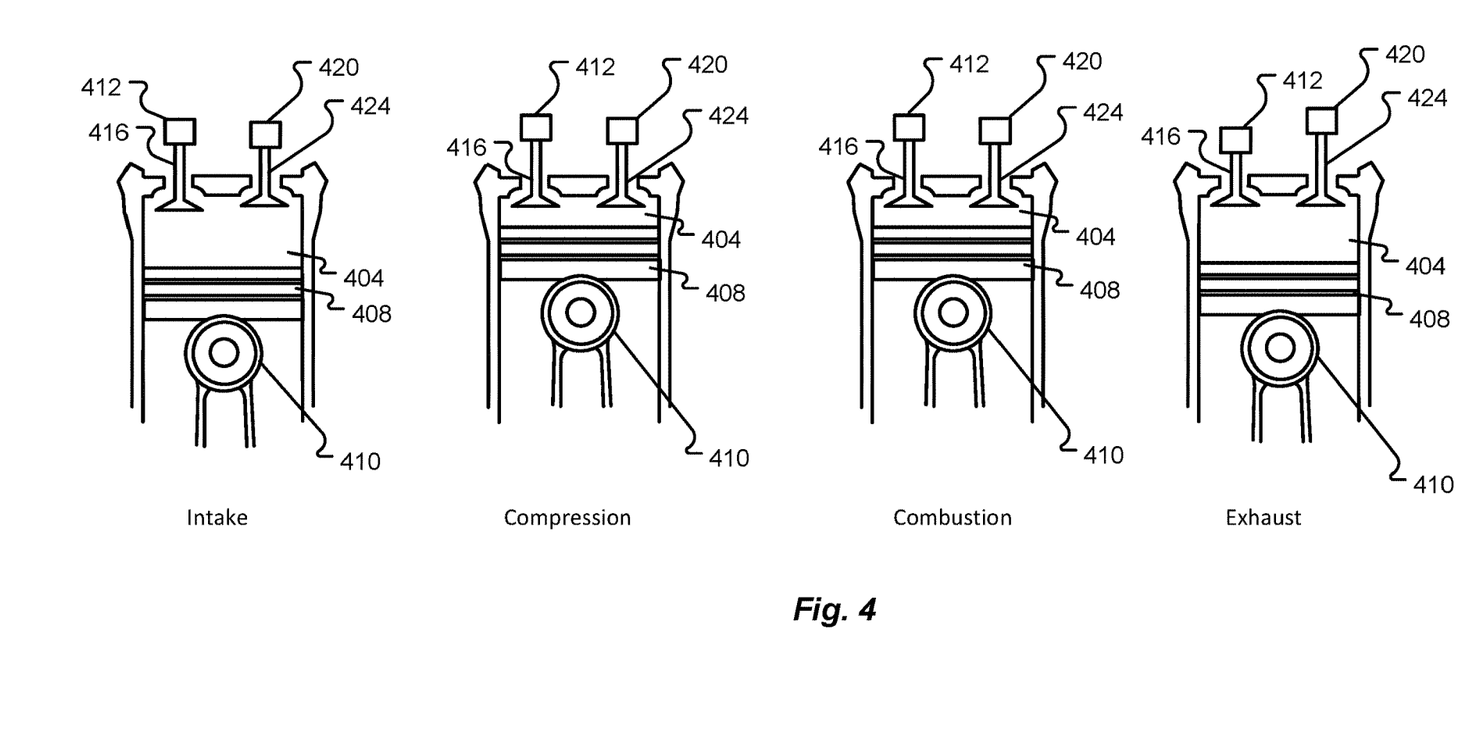
FIG. 4 depicts a third example of a cylinder, inlet valve, and exhaust valve operation in accordance with examples of the present disclosure.

As another non-limiting example, as depicted in FIG. 4, variable valve actuators 412 and 420 may control when the inlet valve 416 and exhaust valve 424 open and close. In accordance with examples of the present disclosure, when the engine is motored, the variable valve actuators 412 and 420 may cause the inlet valve 416 and the exhaust valve 424 to remain in an open position during the intake, compression, combustion, and exhaust strokes. Accordingly, while the piston 408 goes up and down in the cylinder 404 in accordance with the movement of the connecting rod 410, any air that is pulled into the cylinder 404 due to the inlet valve 416 and exhaust valve 424 being in the open position is not compressed; rather the air is pushed out both the inlet valve 416 and the exhaust valve 424. Accordingly, the increased drag and resistance associated with the engine functioning as an air pump can be reduced. Although keeping the inlet valve 416 and exhaust valve 424 open causes more drag and resistance than keeping those valves closed while motoring the engine, it is still more efficient than allowing the inlet valve 416 and exhaust valve 424 to open and close as they would in normal operation (such as described above in relation to FIG. 2). As such, causing the inlet valve 416 and the exhaust valve 424 to remain in an open position during the intake, compression, combustion, and exhaust strokes may be used as a way to create more drag/resistance than the operations described with respect to FIG. 3 (keeping the valves closed) and less drag/resistance than described with respect to normal operation in FIG. 2. This is potentially useful in situations, as will be described, where progressively more drag/resistance is desired or required depending on the braking needs of the vehicle.

Referring back to FIG. 1, in accordance with examples of the present disclosure, the vehicle control system 120 may use multiple sources of information to determine when to deactivate cylinders by keeping inlet and outlet valves in a constant position (open or closed), as described. For example, vehicle control system 120 may use terrain information and distance measurements to determine speed trajectory information to implement a control strategy for the vehicle when traveling along an upcoming segment. The vehicle control system 120 may utilize the speed trajectory information to determine optimal locations for engaging the e-motor 168 to charge the energy storage system 172. That is, the vehicle control system 120 may take into account a terrain, speed trajectory, charge level of the energy storage system 172, and a distance between the vehicle 104 and a vehicle in front of the vehicle 104 if any, to determine an optimal coasting location and/or an optimal use of the e-motor 168 for braking purposes to slow the vehicle 104. For example, by engaging the e-motor 168, additional resistance is introduced or otherwise added to the drivetrain 148, transmission 144, and/or internal combustion engine 140; the additional resistance added by the e-motor 168 may slow the vehicle 104 to a desired speed while generating electrical charge to charge the energy storage system 172. However, advantageously, when the e-motor 168 is engaged to recover energy during a coast, slowing, or braking event, the intake and exhaust valves, such as 316 and 324 may be maintained in the closed position to minimize the amount of resistance or drag introduced by the internal combustion engine when the internal combustion engine is being motored. Similarly, in some examples, when the e-motor 168 is engaged to recover energy during a coast or braking event, the intake and exhaust valves, such as 416 and 424 may remain in the open position to reduce the amount of resistance or drag introduced by the engine when the engine is motored.

Figure 5:
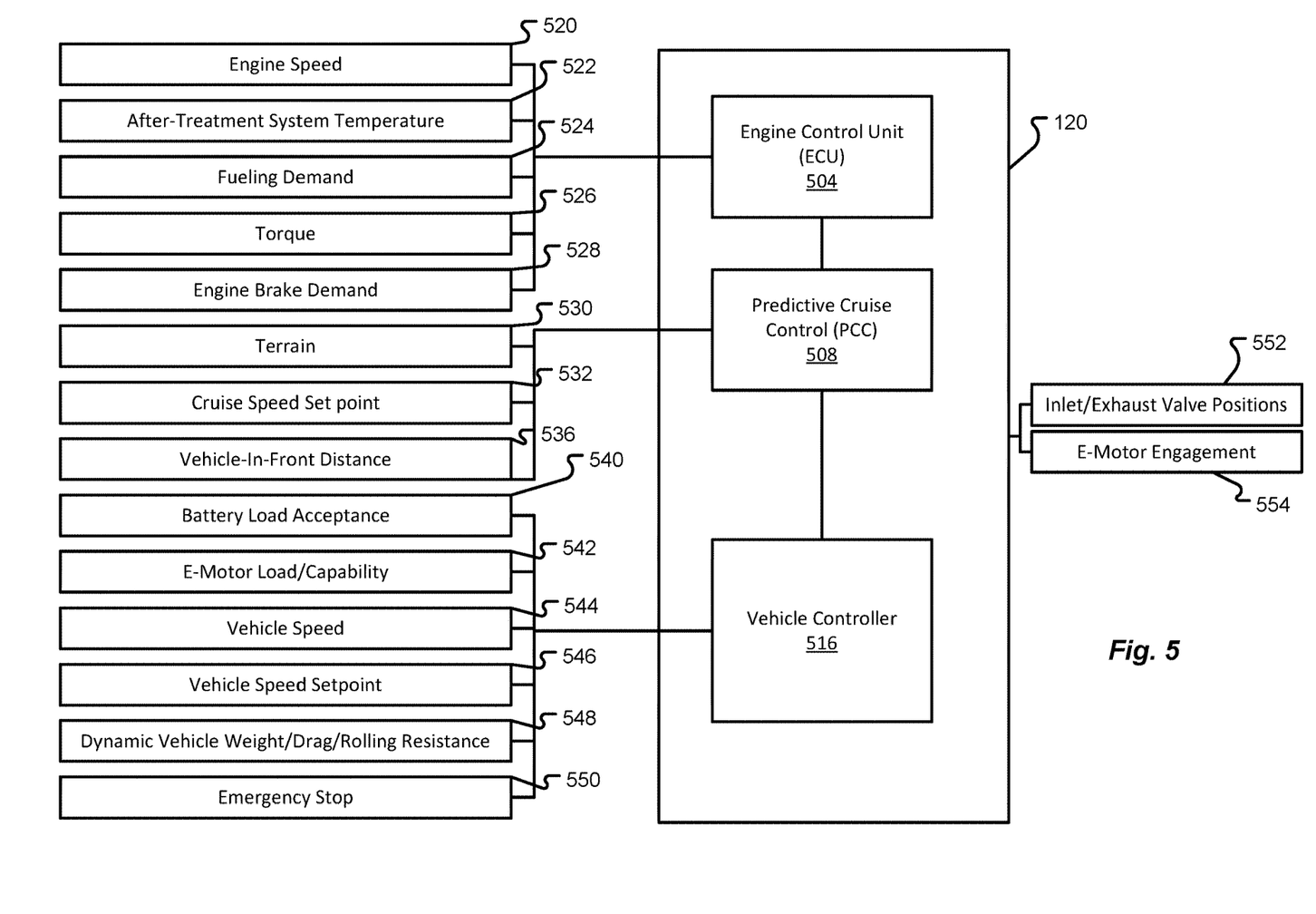
FIG. 5 depicts an example of a vehicle control system in accordance with examples of the present disclosure.

The vehicle control system 120 may utilize one or more parameters to determine when to engage the e-motor 168 for energy recovery purposes and how to control the behavior of the internal combustion engine 140. As depicted in FIG. 5, in examples, the vehicle control system 120 may include an engine control unit (ECU) 504, a predictive cruise control module (PCC) 508, and a vehicle controller 516.

The ECU 504 may utilize engine speed 520, after-treatment system temperature 522, vehicle fueling demand 524, torque 526, and/or engine brake demand 528 parameters to control the internal combustion engine 140 of the vehicle 104. For example, a fuel flow rate and a fuel to air mixture ratio may be based on the engine speed 520, after-treatment system temperature 522, vehicle fueling demand 524, torque 526, and/or engine brake demand 528. As used herein, after-treatment system temperature includes one or more of the temperature(s) of after-treatment catalyst, after-treatment fluid, and after-treatment exhaust.

The PCC 508 may utilize terrain 530 and/or a cruise speed set point 532 to control or otherwise influence the ECU 504 and vehicle control system 120. For example, when the terrain includes an incline or a decline, the vehicle 104 may need to speed up or coast, slow, or brake. Similarly, the PCC 508 may utilize a vehicle-in-front distance to impact the ECU 504 and/or the vehicle control system 120. For example, when a distance between a vehicle in front the vehicle 104 and the vehicle 104 decreases, the vehicle 104 may coast, slow, or brake. The vehicle controller 516 may collect and utilize a measure of the battery load acceptance 540, an e-motor load and/or capability 542, a vehicle speed 544, a vehicle speed set point 546, a dynamic vehicle weight/drag/rolling resistance 548 of the vehicle 104, and/or whether an emergency stop 550 is required.

As one non-limiting example, the battery load acceptance 540 may be associated with an amount of charge of the energy storage system 172 and/or a determination as whether or not the energy storage system 172 is capable of accepting additional charge. As another non-limiting example, the e-motor load/capability may correspond to an amount of charge that is capable of being produced by the e-motor and/or whether the e-motor is reaching a charge generation run-time maximum. As another non-limiting example, the dynamic vehicle weighting/drag/rolling resistance may correspond to a realized load, or resistance, of the tractor 104 when taking into account, trailer 108 weighting, vehicle 104 drag, and vehicle 104 rolling resistance; that is, when the vehicle 104 is going down a hill, a measured dynamic vehicle weight/drag/rolling resistance may appear to be reduced due at least in part to the grade of the hill.

The vehicle control system 120, based on one or more of the ECU 504, PCC 508, and/or vehicle controller 516 may determine or otherwise generate an indication to set one or more of the inlet and/or exhaust valves at an open or closed position and/or whether to engage the e-motor 168 to recapture energy and provide a charge to the energy storage system 172.

As one non-limiting example, one or more of the systems/sensors may indicate that the vehicle 104 is cresting a hill; accordingly, the fueling demand 524, torque 526, and/or engine brake demand 528 may indicate that the vehicle 104 is in a position to recapture energy utilizing the e-motor 168. Thus, so as to reduce engine drag created by the air and piston movement within one or more cylinders of the internal combustion engine 140, the vehicle control system 120 may cause the inlet valves and exhaust valves to close or otherwise remain in a closed position when the e-motor 168 is engaged. As another non-limiting example, should the vehicle speed indicate that the vehicle 104 is accelerating, an increase in engine resistance may be required to reduce the speed of the vehicle 104 or otherwise maintain a speed at a speed set point or cruise set point. Accordingly, the vehicle control system 120 may cause the inlet valves and exhaust valves to open or otherwise remain in an open position when the e-motor 168 is engaged to maximize energy recapture.

As another non-limiting example, if the vehicle speed indicates that the vehicle 104 continues to accelerate, additional engine resistance may be increased by operating the engine as an air pump as previously discussed. Accordingly, the vehicle control system 120 may cause the inlet valves and exhaust valves to open and/or close in accordance with normal operation of the internal combustion engine 140, though no fuel is added and therefore no combustion occurs. In some instances, if the PCC 508 indicates that braking is needed, engine braking and/or exhaust braking may be implemented.

In examples, the vehicle control system 120 may use additional vehicle information collected or produced by one of the ECU 504, PCC 508, and vehicle controller 516 to balance the need/desire for resistance (or lack thereof) within the internal combustion engine and the energy-capture of the e-motor 168. For example, the vehicle control system can determine at any particular time, based on collection of vehicle information from the ECU 504, PCC 508, and vehicle controller 516, whether to prioritize energy recapture, braking power, engine heat, or another priority, as needed, and control the operation of the valves of the internal combustion engine 140 accordingly. As a nonexclusive example, the ECU 504 may provide information that indicates whether engine heat/resistance is desired due to the current after-treatment system temperature, such as the temperature of diesel exhaust fluid (DEF), the temperature of after-treatment catalyst, and/or the temperature of after-treatment exhaust. The vehicle control system 120 may use that information to determine whether and to what extent that the valves of the internal combustion engine 140 are activated/deactivated when e-motor 168 is engaged with internal combustion engine 140. Other information collected by components of the vehicle control system 120 may also be used to control the amount of resistance and heat produced by the internal combustion engine 140 while balancing the desire to maximize energy capture by an engaged e-motor 168. For example, coolant temperature may be used in making a decision whether to engage the e-motor and/or deactivate the cylinder(s).

Figure 6:
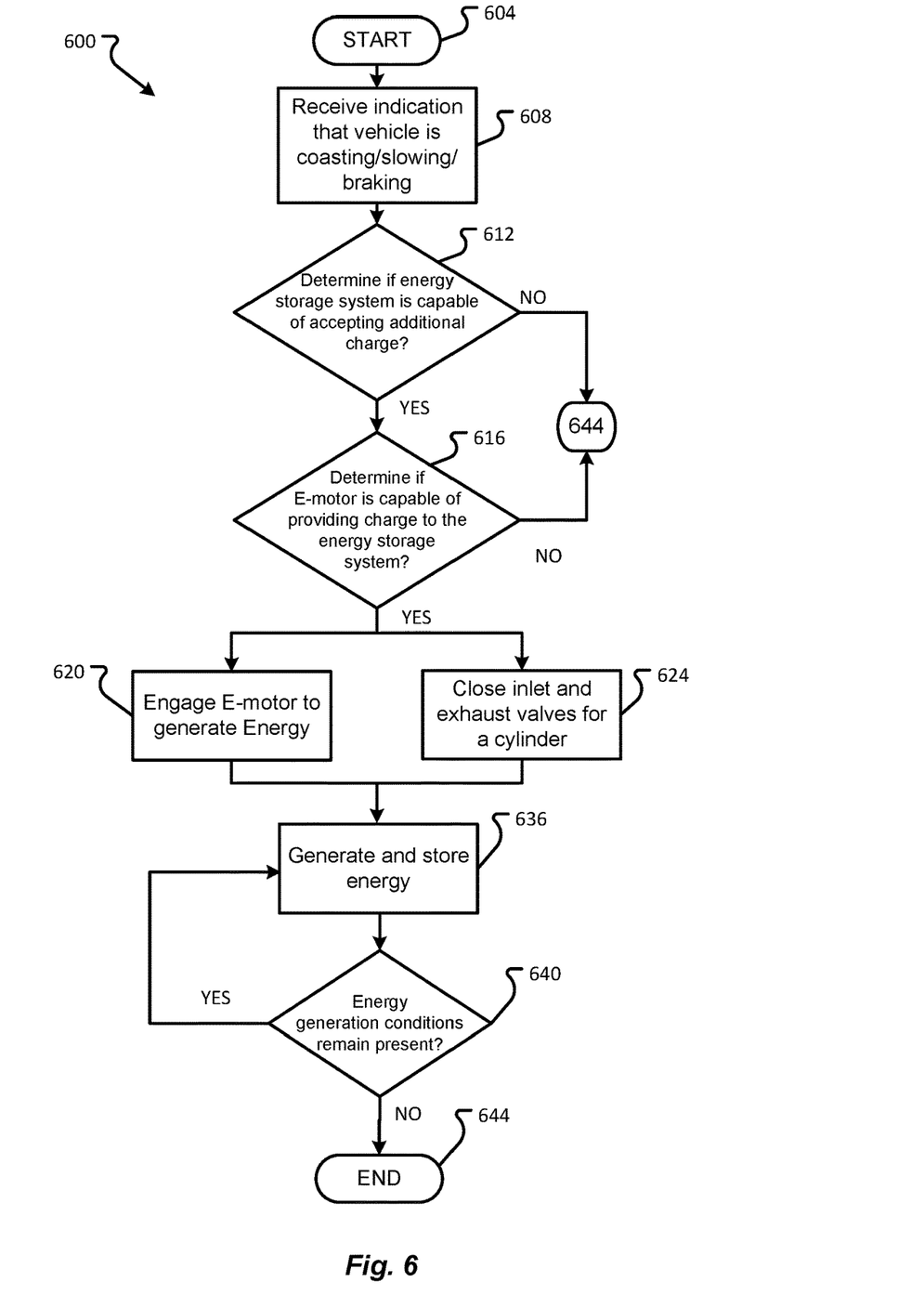
FIG. 6 depicts a first method directed to generating energy utilizing an e-motor and deactivating a cylinder of an internal combustion engine in accordance with examples of the present disclosure.

FIG. 6 shows a method 600 for engaging an E-motor, such as the e-motor 168, to generate charge during a coasting, slowing, and/or braking event and further deactivate one or more cylinders in accordance with examples of the present disclosure. A general order for the steps of the method 600 is shown in FIG. 6. Generally, the method 600 starts with a start operation 604 and ends with an end operation 644. The method 600 can include more or fewer steps or can arrange the order of the steps differently from those shown in FIG. 6. The method 600 can be executed as a set of computer-executable instructions executed by a processor and encoded or stored on a computer readable medium. Further, the method 600 can be performed by gates or circuits associated with a processor, an ASIC, a FPGA, a SOC, or other hardware device, such as the vehicle control system 120. Hereinafter, the method 600 shall be explained with reference to the systems, components, devices, modules, software, signals, data structures, interfaces, methods, etc. described in conjunction with FIGS. 1-5.

The method 600 may flow from the start operation 604 to 608, where an indication that a vehicle is coasting, slowing, or braking may be received. As one non-limiting example, the vehicle control system 120 may receive an indication that the vehicle 104 is cresting a hill or starting to descend a hill. As another non-limiting example, the vehicle control system 120 may receive an indication that that the speed of the vehicle 104 is changing. As one non-limiting example, the vehicle control system 120 may receive an indication that braking is needed, such as when a driver engages a slowing procedure or the speed of the vehicle exceeds a desired set point of the PCC. The method 600 may then flow to 608, where the vehicle control system may determine if the energy storage system 172 for example, can accept additional charge. In some instances, the energy storage system 172 may have reached a threshold capacity and may no longer be able to accept electrical charge generated by the E-motor for storage. If the energy storage system 172 is unable to accept additional charge, the method 600 may flow to 644 and end. Otherwise, the method 600 may determine if the E-motor is capable of providing charge to the energy storage system 172. For example, in some instances, the E-Motor may have reached a maximum run-time limit, be at a temperature above a maximum operating temperature, or be incapable of functioning for various reasons. If the E-motor is unable to provide additional charge, the method 600 may flow to 644 and end.

Otherwise, the method 600 may proceed to 620 where the E-motor may be engaged to capture or otherwise generate energy as previously described. Moreover, the method 600 may proceed to reduce an amount of resistance associated with the engine by deactivating the inlet and exhaust valves for one or more cylinders, as previously described. That is, the vehicle control system 120 may cause one or more valve actuators to operate in a manner such that the inlet valve and exhaust valve of one or more cylinders remain in the closed position (or in another embodiment, remain in an open position). The method 600 may then proceed to 636 where energy is generated by the E-motor 168, for example, and is stored at the energy storage system 172, for example. The method 600 may proceed back to 636 if one or more energy generation conditions remain present. For example, if an indication that the vehicle 104 is coasting, slowing, or braking is received then the method 600 may proceed back to 636. As another non-limiting example, if the energy storage system continues to be capable of storing additional charge, then method 600 may proceed back to 636. As another non-limiting example, if the E-motor has not exceeded a maximum run-time or has not exceeded a maximum temperature, then the method 600 may proceed back to 636. Alternatively, or in addition, if the E-motor has exceeded a maximum run-time or exceeded a maximum temperature, or if the energy storage system has a charge that is equal to or greater than a fully "charged" level, the method 600 may end. Alternatively, or in addition, if the vehicle 104 is not coasting, slowing, or braking, but rather accelerating or otherwise requiring a large fuel demand to power up an incline, for example, then the method 600 may end at 644, at which time the inlet an exhaust valves of the one or more cylinders of the engine are returned to their normal operation.

Figure 7:
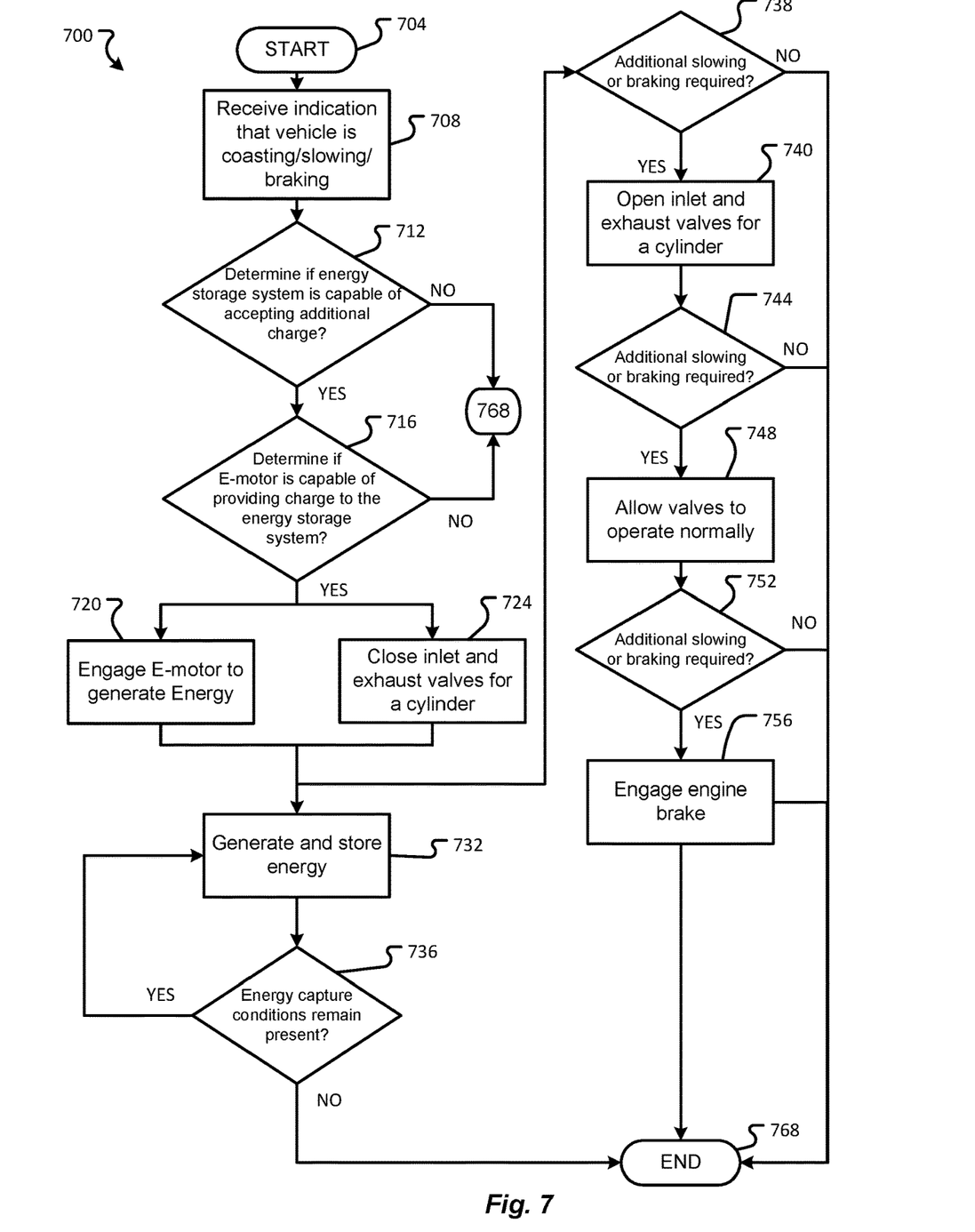
FIG. 7 depicts a second method directed to generating energy utilizing an e-motor and deactivating a cylinder of an internal combustion engine in accordance with examples of the present disclosure.

FIG. 7 shows a method 700 for engaging an e-motor, such as the e-motor 168, to generate charge during a coasting, slowing, and/or braking event and further deactivate one or more cylinders in accordance with examples of the present disclosure. Moreover, FIG. 7 depicts one or more steps for slowing a vehicle 104 if slowing and/or additional braking are required. A general order for the steps of the method 700 is shown in FIG. 7. Generally, the method 700 starts with a start operation 704 and ends with an end operation 768. The method 700 can include more or fewer steps or can arrange the order of the steps differently than those shown in FIG. 7. The method 700 can be executed as a set of computer-executable instructions executed by a processor and encoded or stored on a computer readable medium. Further, the method 700 can be performed by gates or circuits associated with a processor, an ASIC, a FPGA, a SOC, or other hardware device, such as the vehicle control system 120. Hereinafter, the method 700 shall be explained with reference to the systems, components, devices, modules, software, signals, data structures, interfaces, methods, etc. described in conjunction with FIGS. 1-6.

Similar to method 600, the method 700 may flow from the start operation 704 to 708, where an indication that a vehicle is coasting, slowing, or braking may be received. As one non-limiting example, the vehicle control system 120 may receive an indication that the vehicle 104 is cresting a hill or starting to descend a hill. As another non-limiting example, the vehicle control system 120 may receive an indication that that the speed of the vehicle 104 is changing. As one non-limiting example, the vehicle control system 120 may receive an indication that braking is needed, such as when a driver engages a slowing procedure or the speed of the vehicle exceeds a desired set point of the PCC. The method 700 may then flow to 708, where the vehicle control system may determine if the energy storage system 172 for example, can accept additional charge. In some instances, the energy storage system 172 may have reached a threshold capacity and may no longer be able to accept electrical charge generated by the E-motor for storage. If the energy storage system 172 is unable to accept additional charge, the method 700 may flow to 768 and ends. Otherwise, the method 700 may determine if the e-motor is capable of providing charge to the energy storage system 172. For example, in some instances, the e-motor may have reached a maximum run-time limit, be at a temperature above a maximum operating temperature, or be incapable of functioning for various reasons. If the e-motor is unable to provide additional charge, the method 700 may flow to 768 and end.

Otherwise, the method 700 may proceed to 720 where the e-motor may be engaged to capture or otherwise generate energy as previously described. Moreover, the method 700 may proceed to reduce an amount of resistance associated with the engine by maintaining the inlet and exhaust valves for one or more cylinders in a closed position at 724, as previously described. That is, the vehicle control system 120 may cause one or more valve actuators to operate in a manner such that the inlet valve and exhaust valve of one or more cylinders remain in the closed position.

Then the method proceed to 732 where energy is generated by the E-motor 168, for example, and is stored at the energy storage system 172, for example. The method 700 may proceed back to 732 where energy is generated if one or more energy generation conditions remain present at 736.

For example, if an indication that the vehicle 104 is coasting, slowing, or braking is received, then the method 700 may proceed back to 732. As another non-limiting example, if the energy storage system continues to be capable of storing additional charge, then method 700 may proceed back to 732. As another non-limiting example, if the e-motor has not exceeded a maximum run-time or has not exceeded a maximum temperature, then the method 700 may proceed back to 732. Alternatively, or in addition, if the e-motor has exceeded a maximum run-time or exceeded a maximum temperature, or if the energy storage system has a charge that is equal to or greater than a "charged" level, the method 700 may end. Alternatively, or in addition, if the vehicle 104 is not coasting, slowing, or braking, but rather accelerating or otherwise requiring a large fuel demand to power up an incline for example, then the method 700 may end at 768.

In addition, after operations 720 and 724, the method 700 may then proceed to 738 where an indication that additional slowing or braking is required. For example, the PCC or other vehicle control systems 508 may determine that vehicle 104 is continuing to go down a hill and the vehicle controller 516 may receive an indication that the vehicle speed 544 is continuing to increase. Alternatively, or in addition, the PCC 508 or other vehicle control systems may receive an indication that the distance between the vehicle 104 and a vehicle in front of the vehicle 104 is less than a threshold such that the vehicle 104 requires slowing and/or braking. Accordingly, the additional slowing and/or braking are required at 738, the method 700 may proceed to 740 where the inlet valves and exhaust valves of one or more cylinders may be opened, as previously described. That is, the vehicle control system 120 may cause one or more valve actuators to operate in a manner such that the inlet valve and exhaust valve of one or more cylinders remain in the open position.

If after opening the inlet valves and outlet valves at 740, and it is determined by the vehicle control system 120 that additional slowing or braking is required at 744, then the vehicle control system 120 may cause the inlet valve and outlet valve of one or more cylinders to operate or otherwise function in a manner consistent with a normal operation of the engine at 748. That is, the vehicle control system 120 may cause one or more valve actuators to operate in a manner such that the inlet valve and exhaust valve of one or more cylinders open and close as if the engine were operating under normal conditions.

If additional slowing or braking is required at 752, the conventional engine brake may be employed at 756. Of course, the method 700 should not be confused with an emergency situation requiring the vehicle 104 to stop as quickly as possible; if such a situation is encountered, then the vehicle 104's foundation brakes may be employed for slowing the vehicle.

In examples, one or more of operations 738-756 may occur while the e-motor continues to generate and store energy at operations 732 and 736. For example, when the e-motor is first engaged at operation 720 and the inlet and exhaust valves are maintained closed at operation 724, the e-motor efficiency may be maximized, as the drag created by the engine is minimized. As additional braking power is needed, the additional operations (such as operations 740, 748, and 756) may be implemented to progressively increase braking power; however, energy can continue to be generated and stored by the e-motor and energy storage system. In this manner, the present systems and methods permit the e-motor to operate at different levels of efficiency in recapturing energy depending on the then-required braking needs of the vehicle.

Further, in examples, the method may skip certain operations. For example, if a vehicle control system determines that more braking power is need than would be provided if the inlet and exhaust valves are maintained closed, the vehicle control system may instead maintain the inlet and exhaust valves open at operation 724 while engaging the e-motor at operation 720. In that example, operations 738 and 740 would be unnecessary. Similarly, other operations may be skipped or performed in different order than set forth in FIG. 7.

At operation 768, the method 700 ends.

The above specification, examples and data provide a complete description of the manufacture and use of the composition of the invention. The description and illustration of one or more aspects provided within this disclosure are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an configuration with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure, in various configurations and aspects, includes components, methods, processes, systems and/or apparatus substantially as depicted and described herein, including various combinations, sub combinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. While the flowcharts have been discussed and illustrated in relation to a particular sequence of events, it should be appreciated that changes, additions, and omissions to this sequence can occur without materially affecting the operation of the disclosed configurations and aspects. Any of the steps, functions, and operations discussed herein can be performed continuously and automatically.

One or more systems and methods of this disclosure have been described in relation to computing and/or processing devices. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein. A number of variations and modifications of the disclosure can be used. It would be possible to provide for some features of the disclosure without providing others.

In yet other configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet other configurations, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet other configurations, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

What is claimed is:

1. A vehicle comprising:
    at least one axle;
    an internal combustion engine including a cylinder having an inlet valve, an exhaust valve, an inlet valve actuator and an exhaust valve actuator, the engine operatively coupled to the at least one axle;
    an electric motor, the electric motor operatively coupled to the engine;
    an energy storage system operatively coupled to the electric motor; and
    a vehicle control system comprising:
        at least one processor;
        memory, operatively connected to the at least one processor and storing instructions that, when executed by the at least one processor, cause the at least one processor to:
            engage the electric motor to generate electric charge based on rotation of the at least one axle;
            deactivate the cylinder by maintaining the inlet valve and the exhaust valve in a constant position while the electric motor is engaged to generate the electric charge, wherein deactivating the cylinder comprises causing the inlet valve actuator to maintain the inlet valve in a closed position and causing the exhaust valve actuator to maintain the exhaust valve in a closed position;
            receive, after deactivating the cylinder, an indication that a speed of the vehicle is to be reduced; and
            based on receiving the indication that the speed of the vehicle is to be reduced:
                cause the inlet valve actuator to move the inlet valve to an open position and maintain the inlet valve in its open position; and
                cause the exhaust valve actuator to move the exhaust valve to an open position and maintain the exhaust valve in its open position.

2. The vehicle of claim 1, wherein engaging the electric motor comprises engaging the electric motor with the internal combustion engine to convert energy from the rotation of the at least one axle into the electric charge.

3. The vehicle of claim 2, wherein the vehicle control system is configured to receive a charge level of the energy storage system and to engage the electric motor and to deactivate the cylinder based on the received charge level.

4. The vehicle of claim 1, wherein the vehicle control system is configured to engage the electric motor and to deactivate the cylinder based on a detected road segment terrain.

5. The vehicle of claim 4, wherein the vehicle control system is configured to disengage the electric motor and activate the cylinder based on a subsequent detected road segment terrain.

6. A method of providing charge to an energy storage system of a vehicle, the method comprising:
   receiving, by a vehicle control system, vehicle information;
   based on the vehicle information, engaging, by the vehicle control system, an electric motor operatively coupled to an internal combustion engine to generate electric charge and to provide the generated electric charge to an energy storage system;
   while engaging the electric motor to generate electric charge, deactivating, by the vehicle control system, a cylinder of the internal combustion engine by maintaining an inlet valve of the cylinder and an exhaust valve the cylinder in a closed position;
   receiving, after deactivating the cylinder, an indication that a speed of the vehicle is to be reduced; and
   based on receiving the indication that the speed of the vehicle is to be reduced:
      causing the inlet valve to move to an open position and to maintain its open position; and
      causing the exhaust valve to move to an open position and to maintain its open position.

7. The method of claim 6, wherein deactivating the cylinder comprises causing an inlet valve actuator to maintain the inlet valve in its closed position and causing an exhaust valve actuator to maintain the exhaust valve in its closed position.

8. The method of claim 6, wherein the vehicle information comprises one or more of the following: whether the vehicle has entered a coasting state, a speed of the vehicle, a change in speed of the vehicle, engine speed, after-treatment system temperature, fueling demand, engine torque, cruise control set point, vehicle-in-front distance, load acceptance by the energy storage system, vehicle weight, and rolling resistance of the vehicle.

9. The method of claim 6, further comprising
   detecting a terrain associated with a road segment; and
   wherein engaging the electric motor and deactivating the cylinder are based on the detected terrain associated with the road segment.

10. The method of claim 6, further comprising:
    disengaging the electric motor and activating the cylinder based on the detected terrain associated with the road segment.

11. A vehicle control system including one or more non-transitory computer-readable media storing instructions that, when executed by at least one processor associated with the vehicle control system, cause the vehicle control system to:
    engage an electric motor coupled to an internal combustion engine of the vehicle to generate electric charge that is provided to an energy storage system;
    while engaging the electric motor to generate electric charge, deactivate a cylinder of the internal combustion engine by maintaining an inlet valve of the cylinder of the internal combustion engine in a closed position and maintain an exhaust valve of the cylinder of the internal combustion engine in a closed position;
    receive, after deactivating the cylinder, an indication that a speed of the vehicle is to be reduced; and
    based on receiving the indication that the speed of the vehicle is to be reduced:
       cause the inlet valve to move to an open position and to maintain its open position; and
       cause the exhaust valve to move to an open position and to maintain its open position.

12. The one or more non-transitory computer-readable media of claim 11, wherein execution of the instructions further cause the vehicle control system to adjust a timing associated with an inlet valve actuator and an exhaust valve actuator of the cylinder such that the inlet valve actuator maintains the inlet valve in its closed position and the exhaust valve actuator maintains the exhaust valve in its closed position.

13. The one or more non-transitory computer-readable media of claim 12, wherein execution of the instructions further cause the vehicle control system to receive a charge level of the energy storage system and to engage the electric motor to generate electric charge based on the charge level.

14. The one or more non-transitory computer-readable media of claim 11, wherein execution of the instructions further cause the vehicle control system to:
    detect a terrain associated with a road segment; and
    engage the electric motor to generate electric charge and to deactivate the cylinder based on the detected terrain associated with the road segment.

15. The one or more non-transitory computer-readable media of claim 14, wherein execution of the instructions further cause the vehicle control system to:
    detect terrain associated with a subsequent road segment; and
    disengage the electric motor and activate the cylinder based on the detected terrain associated with the subsequent road segment.

16. The one or more non-transitory computer-readable media of claim 11, wherein execution of the instructions further cause the vehicle control system to receive a charge level of the energy storage system and disengage the electric motor and activate the cylinder based on the received charge level of the energy storage system.

17. The vehicle of claim 1, wherein the instructions further cause the at least one processor to:
    receive an indication that the speed of the vehicle is to be further reduced; and
    based on receiving the indication that the speed of the vehicle is to be further reduced, activate the cylinder by allowing the inlet valve and exhaust valve to open and close normally.

18. The method of claim 6, further comprising:
    receiving an indication that the speed of the vehicle is to be further reduced; and
    based on receiving the indication that the speed of the vehicle is to be further reduced, activating the cylinder by allowing the inlet valve and exhaust valve to open and close normally.

19. The one or more non-transitory computer-readable media of claim 11, wherein execution of the instructions further cause the vehicle control system to:
    receive an indication that the speed of the vehicle is to be further reduced; and
    based on receiving the indication that the speed of the vehicle is to be further reduced, activate the cylinder by allowing the inlet valve and exhaust valve to open and close normally.

* * * * *